(12) United States Patent
Lin et al.

(10) Patent No.: US 12,184,166 B2
(45) Date of Patent: Dec. 31, 2024

(54) POWER CONVERSION SYSTEM WITH RIPPLE INJECTION AND POWER CONVERSION CONTROL METHOD

(71) Applicant: DELTA ELECTRONICS, INC., Taoyuan (TW)

(72) Inventors: Yu-Jen Lin, Taoyuan (TW); Terng-Wei Tsai, Taoyuan (TW); Chia-Hsiong Huang, Taoyuan (TW); Cheng-Chung Li, Taoyuan (TW); Chien-Hsi Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 552 days.

(21) Appl. No.: 17/582,153

(22) Filed: Jan. 24, 2022

(65) Prior Publication Data

US 2023/0179088 A1 Jun. 8, 2023

(30) Foreign Application Priority Data

Dec. 2, 2021 (CN) .......................... 202111476715.0

(51) Int. Cl.
*H02M 1/42* (2007.01)
*H02J 3/01* (2006.01)
*H02J 7/00* (2006.01)
*H02M 3/156* (2006.01)

(52) U.S. Cl.
CPC ............ *H02M 1/4216* (2013.01); *H02J 3/01* (2013.01); *H02J 7/00308* (2020.01); *H02M 3/156* (2013.01); *H02J 2207/20* (2020.01)

(58) Field of Classification Search
CPC ................................................. H02M 1/4216
USPC ........................................................ 320/162
See application file for complete search history.

(56) References Cited

U.S. PATENT DOCUMENTS

| | | | | |
|---|---|---|---|---|
| 2014/0132232 A1* | 5/2014 | MacLean | ............ | H02M 3/1588 323/271 |
| 2014/0253064 A1* | 9/2014 | Swanson | ............. | H02M 3/1584 323/272 |
| 2014/0375288 A1* | 12/2014 | Nora | ....................... | H02J 1/102 323/272 |
| 2021/0091681 A1* | 3/2021 | Abuelnaga | .......... | H02M 5/4585 |

(Continued)

FOREIGN PATENT DOCUMENTS

CN 112202322 A 1/2021
CN 112688545 A 4/2021

*Primary Examiner* — Jerry D Robbins
(74) *Attorney, Agent, or Firm* — MUNCY, GEISSLER, OLDS & LOWE, P.C.

(57) ABSTRACT

A power conversion system with ripple injection includes an AC-DC conversion unit, a voltage regulation unit, at least one DC-DC conversion unit, at least one load, and a first control unit. The voltage regulation unit provides a DC link and receives one portion of an input power as an energy storage power. Each DC-DC conversion unit receives the other portion of the input power as an output power. The at least one load correspondingly receives the output power for being supplied power. The first control unit is coupled to the DC link, the at least one DC-DC conversion unit, and the at least one load. The first control unit controls the at least one DC-DC conversion unit to adjust a magnitude of a ripple of the output power to perform a ripple injection operation according to a magnitude of a ripple of the input power.

17 Claims, 6 Drawing Sheets

(56) References Cited

U.S. PATENT DOCUMENTS

2021/0281161 A1* 9/2021 Acker .................... H02M 1/15
2021/0404078 A1* 12/2021 Srinivasan .......... H02M 1/4216

* cited by examiner

POWER CONVERSION SYSTEM WITH RIPPLE INJECTION AND POWER CONVERSION CONTROL METHOD

BACKGROUND

Technical Field

The present disclosure relates to a power conversion system and a power conversion control method, and more particularly to a power conversion system with ripple injection and a power conversion control method.

Description of Related Art

The statements in this section merely provide background information related to the present disclosure and do not necessarily constitute prior art.

The input power of the power conversion system includes a DC component and a ripple component. One portion of the input power flows into a capacitor of a DC Link, and the other portion of the input power flows into a subsequent (rear-stage) battery charger. In the traditional method, the battery charger charges the battery by using a constant-current (CC) mode, where the output power is a fixed value, which can only consume the DC component of the input power, and the ripple (AC) component of the input power will flow into the capacitor of the DC link, thereby causing large capacitor voltage ripples and easily damage the capacitor. Furthermore, if the power grid is abnormal, the fluctuation of the input power causes excessive voltage ripple on the DC link, which may easily trigger the overvoltage protection and cause the possibility of tripping the battery charging station.

SUMMARY

An object of the present disclosure is to provide a power conversion system with ripple injection to solve the problems of existing technology.

In order to achieve the above-mentioned object, the power conversion system with ripple injection includes an AC-DC conversion unit, a voltage regulation unit, at least one DC-DC conversion unit, at least one load, and a first control unit. The AC-DC conversion unit includes a first input side and a first output side. The first input side receives an AC power source to provide an input power. The voltage regulation unit is coupled to the first output side, and provides a DC link and receives one portion of the input power as an energy storage power. Each DC-DC conversion unit includes a second input side and a second output side. The second input side is coupled to the DC link, and receives the other portion of the input power as an output power. The at least one load is coupled to the second output side, and correspondingly receives the output power provided from the at least one DC-DC conversion unit for being powered supply. The first control unit is, coupled to the DC link, the at least one DC-DC conversion unit, and the at least one load. The first control unit controls the at least one DC-DC conversion unit to adjust a magnitude of a ripple of the output power to perform a ripple injection operation to the at least one load according to a magnitude of a ripple of the input power.

In one embodiment, when the first control unit determines that a DC link voltage is greater than or equal to a threshold voltage, the ripple injection operation is activated.

In one embodiment, the at least one DC-DC conversion unit jointly evenly adjusts the magnitude of the ripple of the output power.

In one embodiment, the at least one DC-DC conversion unit is under a constant-current operation, and the first control unit controls the at least one DC-DC conversion unit to perform a current ripple injection operation.

In one embodiment, the at least one DC-DC conversion unit is under a constant-voltage operation, and the first control unit controls the at least one DC-DC conversion unit to perform a voltage ripple injection operation.

In one embodiment, the first control unit determines a power ripple phase angle inputted to the DC link, and the ripple injection operation is activated according to the matched power ripple phase angle.

In one embodiment, the power conversion system further includes a second control unit. The second control unit is coupled to the AC-DC conversion unit and the DC link, and receives the AC power source. When the AC power source is a three-phase AC power source, the second control unit controls a three-phase current of an AC input current flowing into the AC-DC conversion to be balanced and even.

In one embodiment, the AC-DC conversion unit is a power factor corrector.

In one embodiment, the voltage regulation unit is a capacitor.

In one embodiment, the at least one DC-DC conversion unit is a battery charger, and the at least one load is a DC rechargeable battery.

Accordingly, the proposed power conversion system with ripple injection achieves technical effects: (1) through the subsequent (rear-stage) ripple injection control compensation, the voltage regulation unit (such as the capacitor) can be prevented from being damaged or the protection mechanism can be activated to protect the capacitor, which can increase the life of the capacitor in the DC link and reduce the maintenance circuit cost, (2) through the rear-stage ripple compensation, the three-phase current balance of the front-stage PFC circuit can be optimized, thereby reducing the electromagnetic interference (EMI) effect of the input current, and it can also reduce the harm to the power grid caused by the imbalanced current.

Another object of the present disclosure is to provide a power conversion control method to solve the problems of existing technology.

In order to achieve the above-mentioned object, the power conversion control method is used to operate a power conversion system. The power conversion system includes an AC-DC conversion unit, a voltage regulation unit, at least one DC-DC conversion unit, at least one load, and a first control unit. The AC-DC conversion unit receives an AC power source to provide an input power. The voltage regulation unit provides a DC link and receives one portion of the input power as an energy storage power. Each DC-DC conversion unit is coupled to the DC link, and receives the other portion of the input power as an output power. The at least one load correspondingly receives the output power provided from the at least one DC-DC conversion unit. The power conversion control method includes steps of: (a) acquiring, by the first control unit, a DC link voltage of the DC link, (b) performing, by the first control unit, a load control or both a ripple injection control and the load control according to a threshold voltage and the DC link voltage, (c) providing, by the first control unit, a first DC-DC control command according to a load demand information and the DC link voltage when the first control unit performs both the ripple injection control and the load control, wherein the load demand information corresponds to a power extracted from the at least one DC-DC conversion unit required by the at least one load, (d) providing, by the first control unit, a second DC-DC control command according to the load demand information when the first control unit performs the load control, and (e) extracting, by the at least one DC-DC conversion unit, the power from the voltage regulation unit and performing a DC power conversion to supply the power required by the at least one load according to the first DC-DC control command or the second DC-DC control command provided by the first control unit.

In one embodiment, in step (b), activating the ripple injection control when the first control unit determines that the DC link voltage is greater than or equal to a threshold voltage.

In one embodiment, the at least one DC-DC conversion unit jointly evenly adjusts the magnitude of the ripple of the output power.

In one embodiment, the at least one DC-DC conversion unit is under a constant-current operation, and the first control unit controls the at least one DC-DC conversion unit to perform a current ripple injection control.

In one embodiment, the at least one DC-DC conversion unit is under a constant-voltage operation, and the first control unit controls the at least one DC-DC conversion unit to perform a voltage ripple injection control.

In one embodiment, the first control unit determines a power ripple phase angle inputted to the DC link, and the ripple injection control is activated according to the matched power ripple phase angle.

In one embodiment, the power conversion system further includes a second control unit. The second control unit is coupled to the AC-DC conversion unit and the DC link, and receives the AC power source. The power conversion control method further includes a step of: (f) controlling, by the second control unit, a three-phase current of an AC input current flowing into the AC-DC conversion to be balanced and even when the AC power source is a three-phase AC power source.

Accordingly, the proposed power conversion control method achieves technical effects: (1) through the subsequent (rear-stage) ripple injection control compensation, the voltage regulation unit (such as the capacitor) can be prevented from being damaged or the protection mechanism can be activated to protect the capacitor, which can increase the life of the capacitor in the DC link and reduce the maintenance circuit cost, (2) through the rear-stage ripple compensation, the three-phase current balance of the front-stage PFC circuit can be optimized, thereby reducing the electromagnetic interference (EMI) effect of the input current, and it can also reduce the harm to the power grid caused by the imbalanced current.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows:

FIG. 4A to FIG. 4C are schematic waveforms of determining ripple injection control according to the present disclosure.

DETAILED DESCRIPTION

Reference will now be made to the drawing figures to describe the present disclosure in detail. It will be understood that the drawing figures and exemplified embodiments of present disclosure are not limited to the details thereof.

Figure 1:
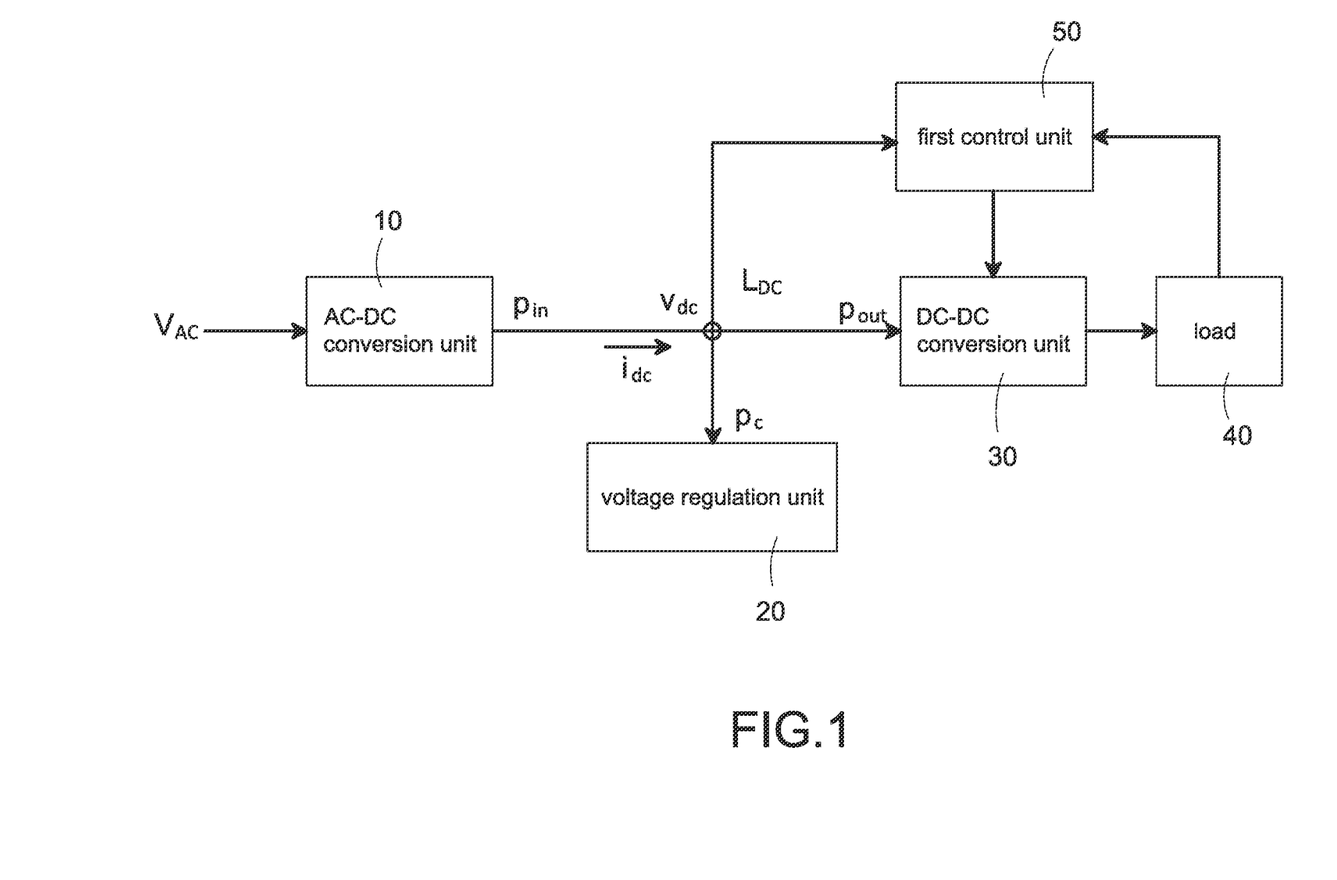
FIG. 1 is a block diagram of a power conversion system with ripple injection according to a first embodiment of the present disclosure.

Please refer to FIG. 1, which shows a block diagram of a power conversion system with ripple injection according to a first embodiment of the present disclosure. The power conversion system with ripple injection mainly includes an AC-DC conversion unit 10, a voltage regulation unit 20, at least one DC-DC conversion unit 30, at least one load 40, and a first control unit 50. In particular, the number of at least one load 40 corresponds to the number of the at least one DC-DC conversion unit 30.

The AC-DC conversion unit 10 has a first input side and a first output side. The first input side receives an AC power source $V_{AC}$ to provide an input power $p_{in}$. In one embodiment, the AC power source $V_{AC}$ is an AC power source provided by a power grid, and the AC power source $V_{AC}$ may be a three-phase AC power source or a single-phase AC power source, the detailed description will be made as follows. Incidentally, the input power $p_{in}$ is uncontrollable, which is related to the power supply of the power grid. In addition, in the power conversion application of the present disclosure, the AC-DC conversion unit 10 is used as a power factor correction unit (power factor corrector) with a power factor correction function.

The voltage regulation unit 20 is coupled to the first output side of the AC-DC conversion unit 10, and provides a DC link $L_{DC}$ (or called a DC bus) and receives one portion of the input power $p_{in}$ as an energy storage power $p_c$, that is, one portion of the input power $p_{in}$ is stored in the voltage regulation unit 20. In one embodiment, the voltage regulation unit 20 is a capacitor for voltage regulation (stabilization) and energy storage.

Each DC-DC conversion unit 30 has a second input side and a second output side. The second input side is coupled to the DC link $L_{DC}$, and receives the other portion of the input power $p_{in}$ as an output power $p_{out}$. In one embodiment, the DC-DC conversion unit 30 is a battery charger, however, this example is for demonstration and not for limitation of the present disclosure. Incidentally, compared to the uncontrollable input power $p_{in}$, the output power $p_{out}$ is controllable. Since the input power $p_{in}$ is equal to the sum of the energy storage power $p_c$ and the output power $p_{out}$, by controlling the magnitude of the output power $p_{out}$, the magnitude of the energy storage power $p_c$ can be correspondingly controlled, that is, energy storage power $p_c$=input power $p_{in}$−output power $p_{out}$. In other words, in order to control the output power $p_{out}$, it is necessary to realize the magnitude of the input power $p_{in}$. Therefore, the present disclosure further detects the magnitude of the input power $p_{in}$, and further performs the ripple injection operation according to the detected ripple magnitude of the input power $p_{in}$, and the detailed description will be made as follows.

Based on the above-mentioned power conversion system of the present disclosure, the input power $p_{in}$ has ripple components, and when passing through the voltage regulation unit 20, the energy storage power $p_c$ and the output power $p_{out}$ distributed by the input power $p_{in}$ also have ripple components respectively. In order to achieve better ripple injection compensation, if the ripple component carried by the output power $p_{out}$ is controlled as close as possible to the ripple component carried by the input power $p_{in}$, the ripple component carried by the energy storage power $p_c$ may be relatively small, and the voltage regulation unit 20 is least affected by the ripple component so as to protect the voltage regulation unit 20 or reduce its loss consumption.

The at least one load 40 is coupled to the second output side of the DC-DC conversion unit 30, and correspondingly receives at least one the output power $p_{out}$ of the at least one DC-DC conversion unit 30 for being supplied power. In one embodiment, the DC-DC conversion unit 30 is a battery charger, and the at least one load 40 is a DC rechargeable battery charged by the battery charger. If the number of the at least one DC rechargeable battery is plural, the plurality of DC rechargeable batteries are coupled (connected) in parallel.

The first control unit 50 is coupled to the DC link $L_{DC}$, the at least one DC-DC conversion unit 30, and the at least one load 40. By detecting a voltage $v_{dc}$ of the DC link $L_{DC}$ (that is, the voltage across the DC link $L_{DC}$) and a DC link input current $i_{dc}$ (that is, the current flowing into the DC link $L_{DC}$) and calculating the product of the voltage $v_{dc}$ and the current $i_{dc}$, the magnitude of the input power $p_{in}$ can be acquired, that is, input power $p_{in}$=voltage $v_{dc}$×current $i_{dc}$. In particular, the calculation of the input power $p_{in}$ may be implemented inside the first control unit 50, or the power is calculated by an external calculation unit, and the calculated power is provided to the first control unit 50. Therefore, the first control unit 50 controls the DC-DC conversion unit 30 to perform the ripple injection operation to at least one load 40 according to the magnitude of the ripple of the input power $p_{in}$, i.e., the magnitude of the AC component of the input power $p_{in}$. Accordingly, the first control unit 50 first determines whether to activate (perform) the ripple injection operation according to the magnitude of the ripple of the input power $p_{in}$. If it is necessary to perform the ripple injection operation, the amount of ripple power to be injected is then determined, and the detailed description will be made as follows.

The output power $p_{out}$ includes the output power of the DC component $P_{out}$ and the output power of the AC component $\tilde{P}_{out}$. The output power of the DC component $P_{out}$ is used to supply power to the at least one load 40, and the output power of the AC component $\tilde{P}_{out}$ is used to provide the compensation of the ripple injection.

Furthermore, since the output power of the AC component $\tilde{P}_{out}$ may be regarded as the form of a sine wave, its magnitude will vary between positive and negative values. The first control unit 50 needs to further determine the phase angle of the ripple component of the input power $p_{in}$ inputted to the DC link $L_{DC}$ so that the ripple injection operation is activated according to the matched power ripple phase angle. In other words, if the phase angle of the ripple component of the input power $p_{in}$ is not determined, and the ripple injection control is activated under an inappropriate phase angle relationship, the energy storage power $p_c$ will become larger. For example, when the input power $p_{in}$ is positive and the controlled output power $p_{out}$ is negative, the energy storage power $p_c$ will increase. Accordingly, the voltage regulation unit 20 is damaged by the ripple component, which conflicts with the spirit of the present disclosure to protect it. Therefore, activating the ripple injection control under an appropriate phase angle relationship will optimize the effect of the ripple injection control.

Figure 2:
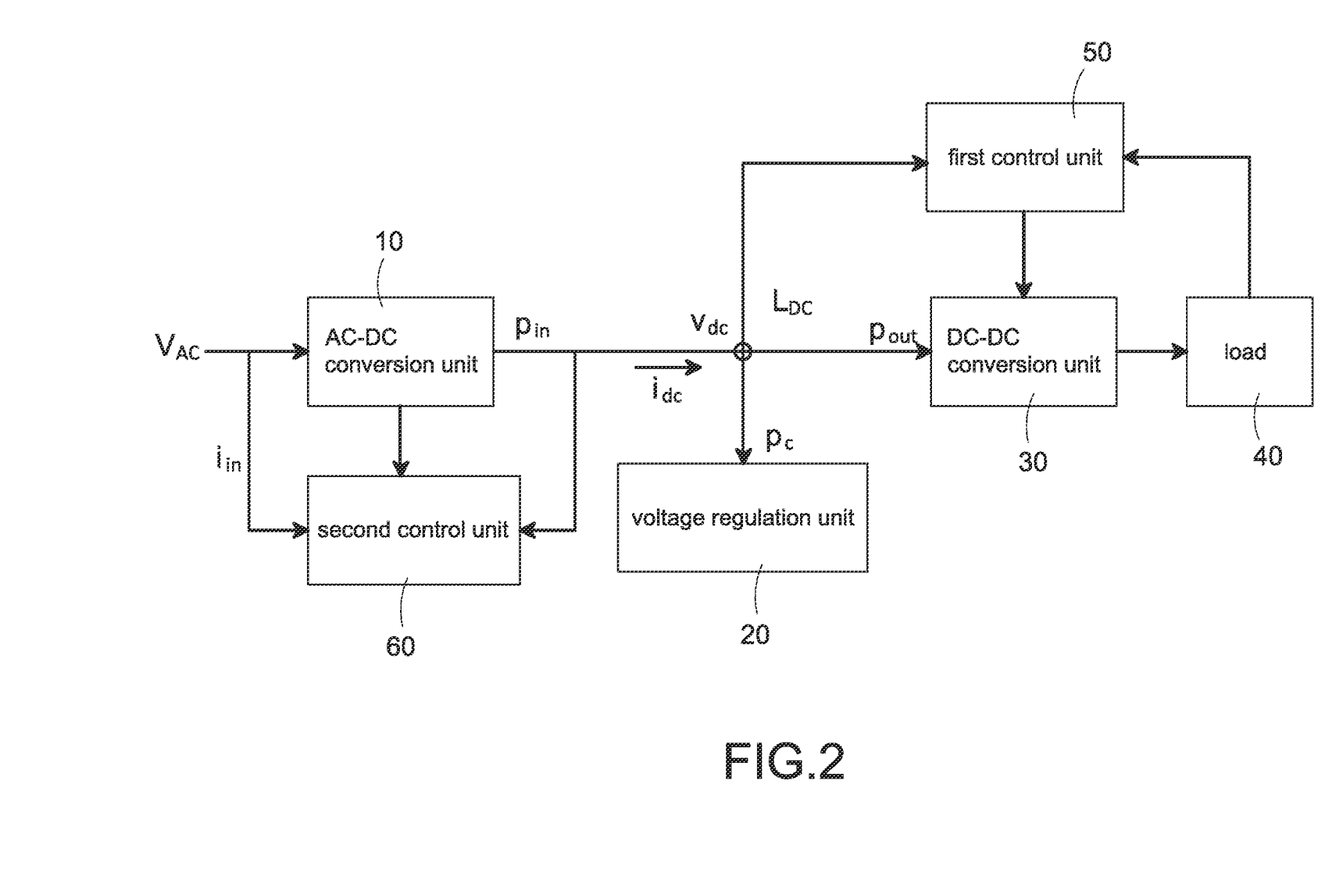
FIG. 2 is a block diagram of the power conversion system with ripple injection according to a second embodiment of the present disclosure.

Please refer to FIG. 2, which shows a block diagram of the power conversion system with ripple injection according to a second embodiment of the present disclosure. The power conversion system with ripple injection further includes a second control unit 60. The second control unit 60 is coupled to the AC-DC conversion unit 10 and the DC link $L_{DC}$, and receives the AC power source $V_{AC}$. When the AC power source $V_{AC}$ is a three-phase AC power source, the second control unit 60 controls a three-phase current of an AC input current flowing into the AC-DC conversion 10 to be balanced and even (equal). Therefore, by controlling the three-phase current to be balanced and even, the electromagnetic interference (EMI) effect of the input current can be reduced, and further the harm to the power grid caused by the imbalanced current can be reduced. When the AC power source $V_{AC}$ is a single-phase AC power source, the second control unit 60 may not be required.

Figure 3:
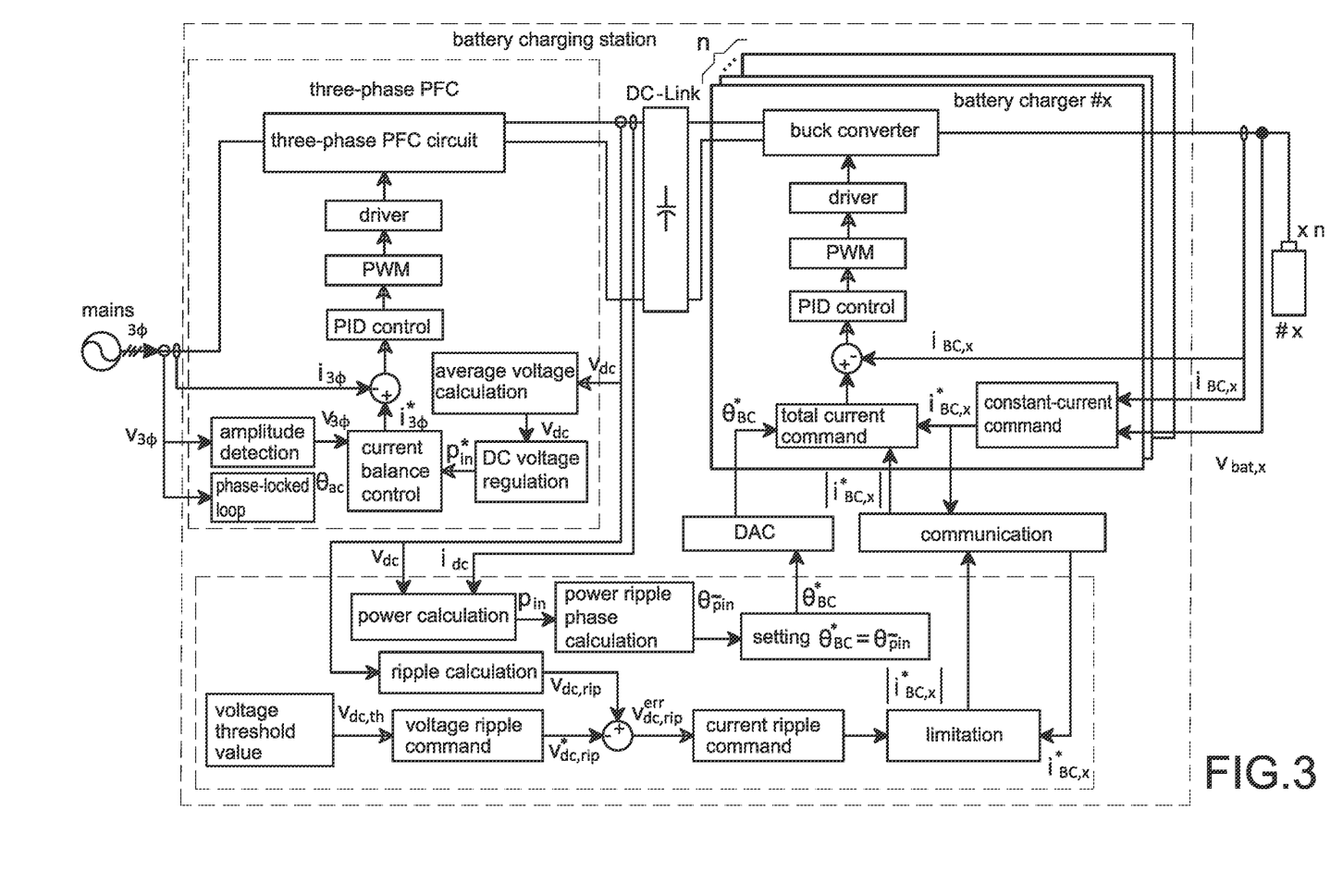
FIG. 3 is a block diagram of a power conversion system using a battery charging station as an application according to the present disclosure.

Please refer to FIG. 3, which shows a block diagram of a power conversion system using a battery charging station as an application according to the present disclosure. One part shown in FIG. 3 (that is, the part related to the three-phase PFC) is used to control the three-phase current of the AC input current flowing into the AC-DC conversion unit 10 for balanced and even current, and the other part (that is, the part related to the battery charger) is used for compensation control of ripple injection.

In the part related the three-phase PFC. A three-phase voltage $v_{3\phi}$, at the power grid side or the mains side is detected, and an amplitude $V_{3\phi}$, of the three-phase (grid) voltage $v_{3\phi}$, is calculated. A phase-locked loop is used to perform a phase-lock operation to the grid voltage to acquire the grid phase angle $\theta_{ac}$. A DC link voltage $v_{dc}$ is detected, and an average value $V_{dc}$ of the three-phase voltage is calculated by an average voltage calculation, and the average value $V_{dc}$ of the three-phase voltage is regulated (stabilized) by an appropriate DC power command $P^*_{in}$ generated by using a DC voltage regulation (stabilization). Using the DC power command $P^*_{in}$, the grid voltage amplitude $V_{3\phi}$, and the grid phase angle $\theta_{ac}$ as input, and using a current balance control to calculate the current command $i^*_{3\phi}$ to make the magnitude of the three-phase current the same.

Detecting the three-phase current $i_{3\phi}$ inputted from the power grid as a feedback value, subtracting the feedback value from the current command $i^*_{3\phi}$, and inputting it to PID control for feedback control with error amplification. The control signal is transmitted to a PWM module, and the PWM single is amplified to drive the three-phase PFC circuit. At this condition, the PFC will draw appropriate power from the power grid to compensate for the energy required by the battery charger to charge the DC battery, thereby stabilizing the average voltage of the DC Link.

In the part related the battery charger. This battery charging station has n battery chargers and n rechargeable batteries, and each battery charger is a step-down (buck) circuit, which is implemented by a buck converter. The voltage $V_{bat,x}$ and charging current $i_{BC,x}$ of the battery terminal to realize the status of the xth rechargeable battery, and use the constant-current command to determine the current magnitude of the constant-current charging.

The charging current command $I^*_{BC,x}$ provided by the constant-current command and the magnitude of the ripple current $|\tilde{i}_{BC,x}|^*$ and phase angle $\theta^*_{BC}$ provided from the host (main control, or host computer) are used to determine the final charging current command $i^*_{BC,x}$ through the total current command. The charging current command $i^*_{BC,x}$ and the feedback charging current $i_{BC,x}$ are subtracted and transmitted to the PID control for error amplification. The control signal is transmitted to the PWM module, and the PWM signal is amplified to drive the step-down circuit (buck converter) to output an appropriate charging current to charge the rechargeable battery.

The host (main control, or host computer) detects the DC link voltage $v_{dc}$ and the current $i_{dc}$ injected to the DC link from the PFC, and uses a power calculation to calculate the power $p_{in}$. The phase angle $\theta_{\tilde{p}_{in}}$ of the power ripple is calculated by a power ripple phase calculation. The phase angle $\theta^*_{BC}$ of the ripple current is set to be the same as the phase angle $\theta_{\tilde{p}_{in}}$ of the power ripple so that the battery charger can effectively transfer the power ripple injected into the DC link to the subsequent (rear-stage) by injecting the ripple current, thereby reducing the DC link voltage.

A digital-to-analog converter is used to transmit the phase angle $\theta^*_{BC}$ of the ripple current to each battery charger. The DC link voltage $v_{dc}$ is detected and a magnitude of a voltage ripple $V_{dc,rip}$ of the DC link voltage $v_{dc}$ is calculated by a ripple calculation. A threshold value $V_{dc,th}$ of the DC link voltage is set, and a magnitude of the voltage ripple $V^*_{dc,rip}$ is calculated by a voltage ripple command calculation. The magnitude of the voltage ripple $V_{dc,rip}$ is subtracted from the magnitude of the voltage ripple $V^*_{dc,rip}$ to acquire a ripple error $V_{dc,rip}^{err}$.

In the current ripple command, if the ripple error $V_{dc,rip}^{err}$ is negative, it means that the DC link voltage has not exceeded the threshold value $V_{dc,th}$. In this condition, there is no need to reduce the ripple voltage so the magnitude of the ripple current $|\tilde{i}_{BC,x}|^*$ is set to 0. If the ripple error $V_{dc,rip}^{err}$ is positive, it means that the voltage ripple is too large and the DC link voltage is greater than the threshold value $V_{dc,th}$. At this condition, the PID controller is used to reduce the ripple error $V_{dc,rip}^{err}$ to acquire the required ripple current $|\tilde{i}_{BC,x}|^*$ so that the DC link voltage can be lower than the threshold value $V_{dc,th}$.

Since the battery charger charges the battery with a constant current, the ripple current cannot be too large. Therefore, the ripple current $|\tilde{i}_{BC,x}|^*$ is set to an upper ripple current $|\tilde{i}_{BC,x}|^*_{max}$ according to the $I^*_{BC,x}$ and limitations. When the calculated ripple current $|\tilde{i}_{BC,x}|^*$ is greater than the upper ripple current $|\tilde{i}_{BC,x}|^*_{max}$, the ripple current command will be limited to the upper ripple current $|\tilde{i}_{BC,x}|^*_{max}$. Finally, the ripple current $|\tilde{i}_{BC,x}|^*$ is communicated and transmitted to each of the battery chargers.

Figure 4A:
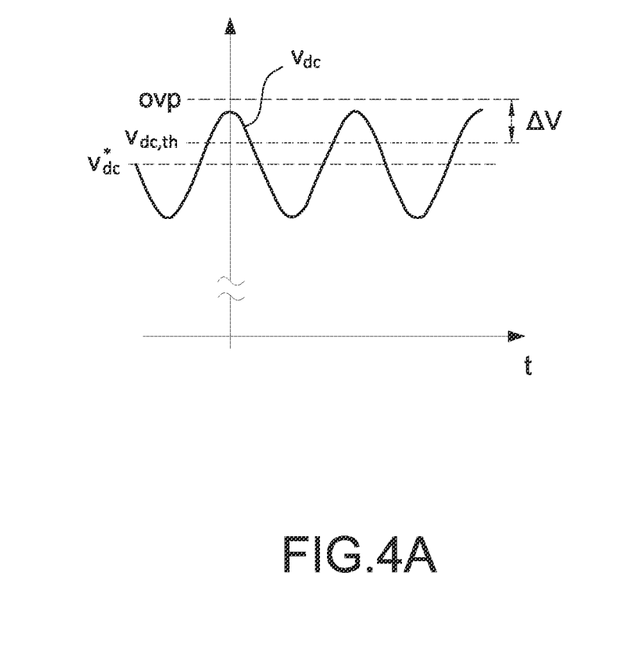
Figure 4B:
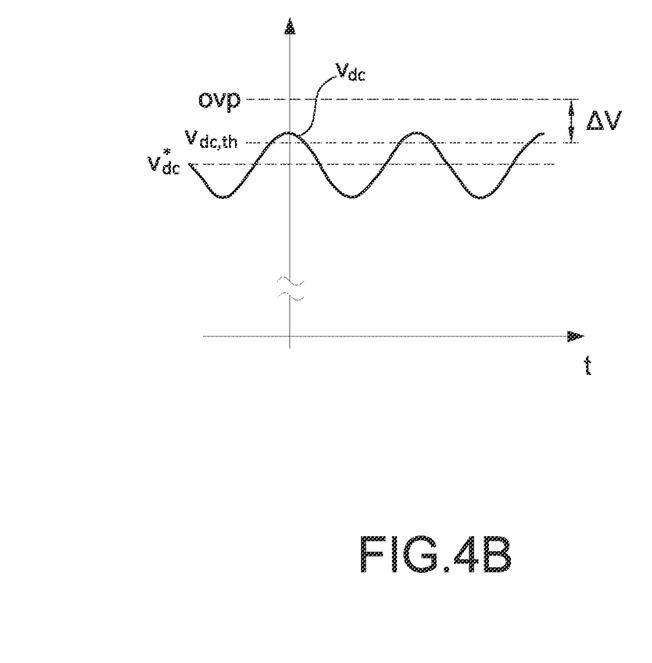
Figure 4C:
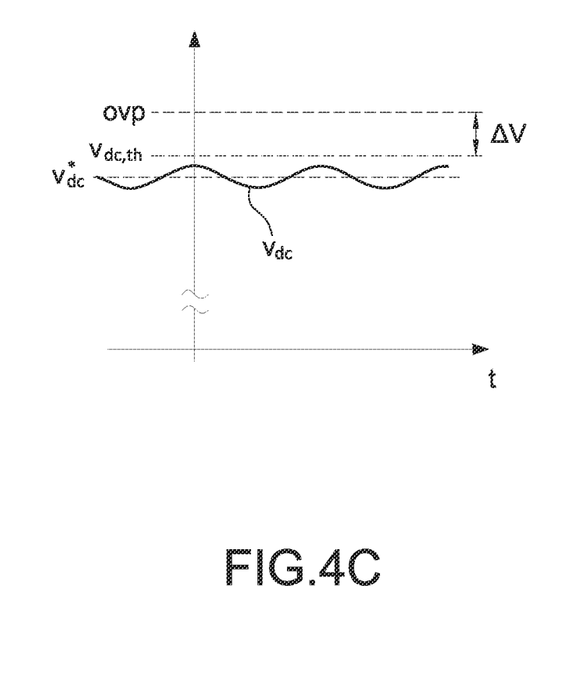

Please refer to FIG. 4A to FIG. 4C, which show schematic waveforms of determining ripple injection control according to the present disclosure. As shown in FIG. 4A, the voltage $v_{dc}$ is a magnitude of the voltage ripple across the DC link $L_{DC}$. In this embodiment, the voltage $v_{dc}$ is compared with an over-voltage protection voltage OVP. Once the voltage $v_{dc}$ reaches or exceeds the over-voltage protection voltage OVP, the over-voltage protection is activated to shut down the system. An embodiment of the present disclosure for determining the timing of the ripple injection, the voltage $v_{dc}$ is compared with a threshold voltage $v_{dc,th}$. When the voltage $v_{dc}$ is greater than or equal to the threshold voltage $v_{dc,th}$, the ripple injection compensation is activated. On the contrary, when the voltage $v_{dc}$ is less than the threshold voltage $v_{dc,th}$, the ripple injection compensation is stopped (not activated). Please refer to FIG. 4B and FIG. 4C, when the voltage $v_{dc}$ is greater than or equal to the threshold voltage $v_{dc,th}$ the ripple injection compensation is activated so that the voltage $v_{dc}$ will gradually become smaller. That is, the part where the voltage $v_{dc}$ being greater than the threshold voltage $v_{dc,th}$ is getting smaller and smaller (as shown in FIG. 4B). In this condition, since the voltage $v_{dc}$ is still greater than or equal to the threshold voltage $v_{dc,th}$, the ripple injection compensation is continuously activated. Until the voltage $v_{dc}$ is less than the threshold voltage $v_{dc,th}$, the ripple injection compensation is stopped (as shown in FIG. 4C).

Take the application of a battery charger (that is, at least one DC-DC conversion unit 30) and a DC battery (that is, at least one load 40) as an example. The number of battery chargers and the number of DC batteries are usually plural, the DC-DC conversion units 30 jointly evenly adjust the magnitude of the ripple of the output power $p_{out}$ in the ripple injection control. Furthermore, since the implement of the ripple injection compensation is related to the conversion power that the DC-DC conversion units 30 can provide (that is, the ripple injection compensation is limited by the maximum output power of each DC-DC conversion unit 30), the ripple injection compensation under the condition that the maximum output power of the DC-DC conversion unit 30 is limited can be continuously performed, as long as it is ensured that the voltage $v_{dc}$ does not reach or exceed the over-voltage protection voltage OVP to avoid shutting down the system.

Incidentally, for power supply applications with different load types, if the at least one DC-DC conversion unit 30 operates at a constant current, the first control unit 50 controls the at least one DC-DC conversion unit 30 to perform a current ripple injection control. Furthermore, if the at least one DC-DC conversion unit 30 operates at a constant voltage, the first control unit 50 controls the at least one DC-DC conversion unit 30 to perform a voltage ripple injection control. Therefore, the compensation control with ripple injection provided by the present disclosure may include compensation control for current ripple injection and also includes compensation control for voltage ripple injection, which depends on the load type of the power supply.

Figure 5:
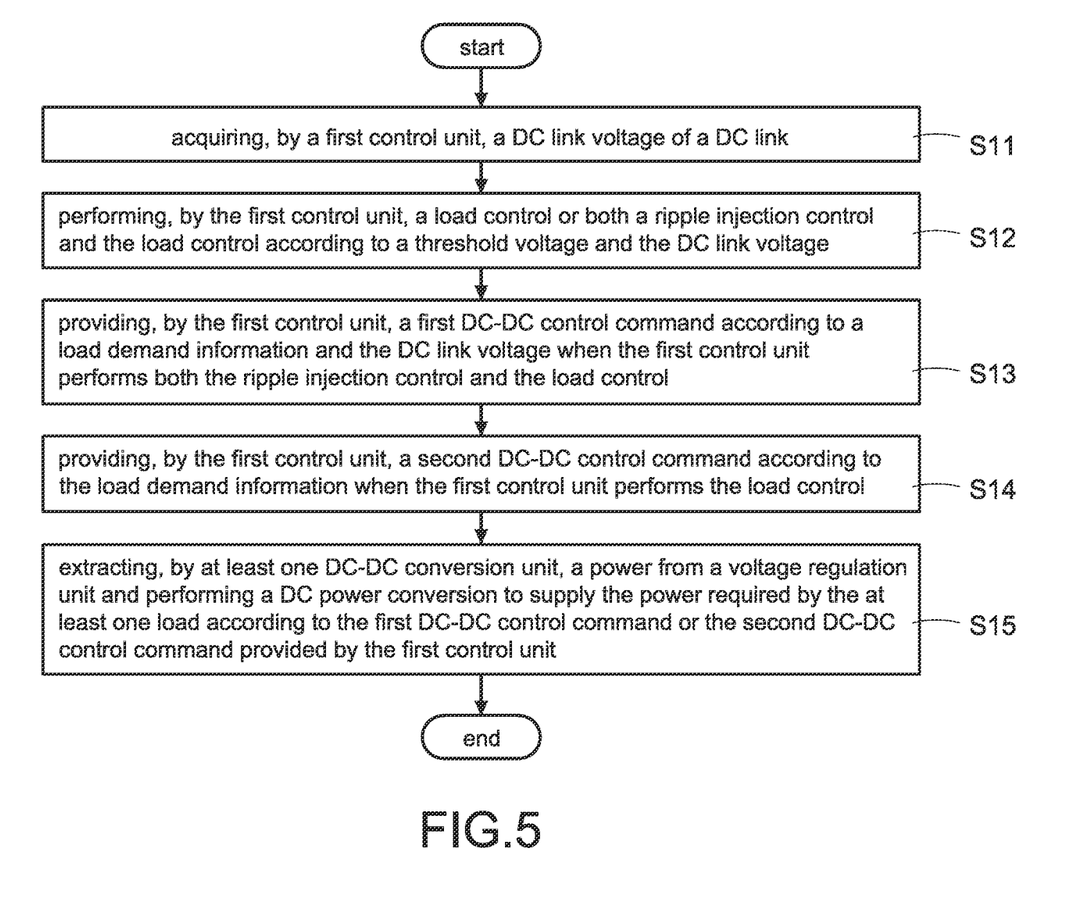
FIG. 5 is a flowchart of a power conversion control method according to the present disclosure.

Please refer to FIG. 5, which shows a flowchart of a power conversion control method according to the present disclosure. The power conversion control method operates a power conversion system. The main structure of the power conversion system may be referred to the above, and the detail description is omitted here for conciseness. The power conversion control method includes steps of: first, acquiring, by the first control unit 50, a DC link voltage of the DC link (S11). Afterward, performing, by the first control unit 50, a load control or both a ripple injection control and the load control according to a threshold voltage and the DC link voltage (S12). If the first control unit 50 only performs the load control, the ripple injection control is not performed, that is, power conversion performed by the power conversion system to supply power to the at least one load 40. If the first control unit 50 performs both the ripple injection control and the load control, it means that the power conversion system is used to supply power to the at least one load 40 for power conversion as well as the ripple injection control provided by the voltage regulation unit 20 is also performed.

Afterward, providing, by the first control unit 50, a first DC-DC control command according to a load demand information and the DC link voltage when the first control unit 50 performs both the ripple injection control and the load control, wherein the load demand information corresponds to a power extracted from the at least one DC-DC conversion unit 30 required by the at least one load 40 (S13).

Afterward, providing, by the first control unit 50, a second DC-DC control command according to the load demand information when the first control unit 50 performs the load control (S14).

Finally, extracting, by the at least one DC-DC conversion unit 30, the power from the voltage regulation unit 20 and performing a DC power conversion to supply the power required by the at least one load 40 according to the first DC-DC control command or the second DC-DC control command provided by the first control unit 50 (S15).

In summary, the present disclosure has the following features and advantages:

1. Through the subsequent (rear-stage) ripple injection control compensation, the voltage regulation unit (such as the capacitor) can be prevented from being damaged or the protection mechanism can be activated to protect the capacitor, which can increase the life of the capacitor in the DC link and reduce the maintenance circuit cost.
2. Through the rear-stage ripple compensation, the three-phase current balance of the front-stage PFC circuit can be optimized, thereby reducing the electromagnetic interference (EMI) effect of the input current, and it can also reduce the harm to the power grid caused by the imbalanced current.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion system with ripple injection, comprising:
    an AC-DC conversion unit, comprising a first input side and a first output side, the first input side configured to receive an AC power source to provide an input power,
    a voltage regulation unit, coupled to the first output side, and configured to provide a DC link and receive one portion of the input power as an energy storage power,
    at least one DC-DC conversion unit, each DC-DC conversion unit comprising a second input side and a second output side, the second input side coupled to the DC link, and configured to receive the other portion of the input power as an output power,
    at least one load, coupled to the second output side, and configured to correspondingly receive the output power provided from the at least one DC-DC conversion unit for being powered supply, and
    a first control unit, coupled to the DC link, the at least one DC-DC conversion unit, and the at least one load,
    wherein the first control unit is configured to control the at least one DC-DC conversion unit to adjust a magnitude of a ripple of the output power to perform a ripple injection operation to the at least one load according to a magnitude of a ripple of the input power.
2. The power conversion system with ripple injection as claimed in claim 1, wherein when the first control unit determines that a DC link voltage is greater than or equal to a threshold voltage, the ripple injection operation is activated.
3. The power conversion system with ripple injection as claimed in claim 2, wherein the at least one DC-DC conversion unit jointly evenly adjusts the magnitude of the ripple of the output power.
4. The power conversion system with ripple injection as claimed in claim 1, wherein the at least one DC-DC conversion unit is under a constant-current operation, and the first control unit controls the at least one DC-DC conversion unit to perform a current ripple injection operation.
5. The power conversion system with ripple injection as claimed in claim 1, wherein the at least one DC-DC conversion unit is under a constant-voltage operation, and the first control unit controls the at least one DC-DC conversion unit to perform a voltage ripple injection operation.
6. The power conversion system with ripple injection as claimed in claim 1, wherein the first control unit determines a power ripple phase angle inputted to the DC link, and the ripple injection operation is activated according to the matched power ripple phase angle.
7. The power conversion system with ripple injection as claimed in claim 1, further comprising:
    a second control unit, coupled to the AC-DC conversion unit and the DC link, and configured to receive the AC power source,
    wherein when the AC power source is a three-phase AC power source, the second control unit controls a three-phase current of an AC input current flowing into the AC-DC conversion to be balanced and even.
8. The power conversion system with ripple injection as claimed in claim 1, wherein the AC-DC conversion unit is a power factor corrector.
9. The power conversion system with ripple injection as claimed in claim 1, wherein the voltage regulation unit is a capacitor.
10. The power conversion system with ripple injection as claimed in claim 1, wherein the at least one DC-DC conversion unit is a battery charger, and the at least one load is a DC rechargeable battery.
11. A power conversion control method configured to operate a power conversion system, the power conversion system comprising:
    an AC-DC conversion unit, configured to receive an AC power source to provide an input power,
    a voltage regulation unit, configured to provide a DC link and receive one portion of the input power as an energy storage power,
    at least one DC-DC conversion unit, each DC-DC conversion unit coupled to the DC link, and configured to receive the other portion of the input power as an output power,
    at least one load, configured to correspondingly receive the output power provided from the at least one DC-DC conversion unit, and
    a first control unit,
    the power conversion control method comprising steps of:
    (a) acquiring, by the first control unit, a DC link voltage of the DC link,
    (b) performing, by the first control unit, a load control or both a ripple injection control and the load control according to a threshold voltage and the DC link voltage,
    (c) providing, by the first control unit, a first DC-DC control command according to a load demand information and the DC link voltage when the first control unit performs both the ripple injection control and the load control, wherein the load demand information corresponds to a power extracted from the at least one DC-DC conversion unit required by the at least one load, (d) providing, by the first control unit, a second DC-DC control command according to the load demand information when the first control unit performs the load control, and (e) extracting, by the at least one DC-DC conversion unit, the power from the voltage regulation unit and performing a DC power conversion to supply the power required by the at least one load according to the first DC-DC control command or the second DC-DC control command provided by the first control unit.

12. The power conversion control method as claimed in claim 11, wherein in step (b), activating the ripple injection control when the first control unit determines that the DC link voltage is greater than or equal to a threshold voltage.

13. The power conversion control method as claimed in claim 12, wherein the at least one DC-DC conversion unit jointly evenly adjusts the magnitude of the ripple of the output power.

14. The power conversion control method as claimed in claim 11, wherein the at least one DC-DC conversion unit is under a constant-current operation, and the first control unit controls the at least one DC-DC conversion unit to perform a current ripple injection control.

15. The power conversion control method as claimed in claim 11, wherein the at least one DC-DC conversion unit is under a constant-voltage operation, and the first control unit controls the at least one DC-DC conversion unit to perform a voltage ripple injection control.

16. The power conversion control method as claimed in claim 11, wherein the first control unit determines a power ripple phase angle inputted to the DC link, and the ripple injection control is activated according to the matched power ripple phase angle.

17. The power conversion control method as claimed in claim 11, wherein the power conversion system further comprises:

a second control unit, coupled to the AC-DC conversion unit and the DC link, and configured to receive the AC power source, wherein the power conversion control method further comprises a step of:

(f) controlling, by the second control unit, a three-phase current of an AC input current flowing into the AC-DC conversion to be balanced and even when the AC power source is a three-phase AC power source.

* * * * *